Patented June 24, 1930

1,766,413

UNITED STATES PATENT OFFICE

KARL THIESS, WALTER GMELIN, AND KARL ZAHN, OF HOCHST-ON-THE-MAIN, GERMANY, ASSIGNORS TO GENERAL ANILINE WORKS, INC., OF NEW YORK, N. Y., A CORPORATION OF DELAWARE

ALKALINE CONDENSATION PRODUCTS OF BZ-1-ETHERS OF BENZANTHRONE

No Drawing. Application filed July 19, 1926, Serial No. 123,592, and in Germany August 26, 1925.

Our present invention relates to the production of vat-dyestuffs of the anthraquinone series.

We have found that a benzanthronyl-ether, having a free 2-position, of the general formula:

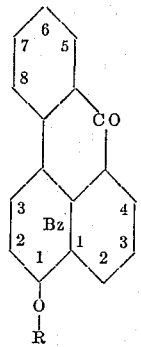

wherein R represents any aliphatic or aromatic residue, for instance methyl, phenyl, cresyl, benzanthronyl, anthraquinonyl or derivatives thereof substituted in any manner in the benzanthrone- or in the R-residue, are converted into valuable vat dyestuffs by subjecting them to the action of alkaline condensing agents, with or without using an indifferent diluent. The conversion can be carried out in the presence of inorganic salts.

In our new process the formation of the dyestuff takes place almost in every case without disturbing secondary reactions, and consequently the yields are very good.

The formation of the dyestuffs may be represented by the following equation:

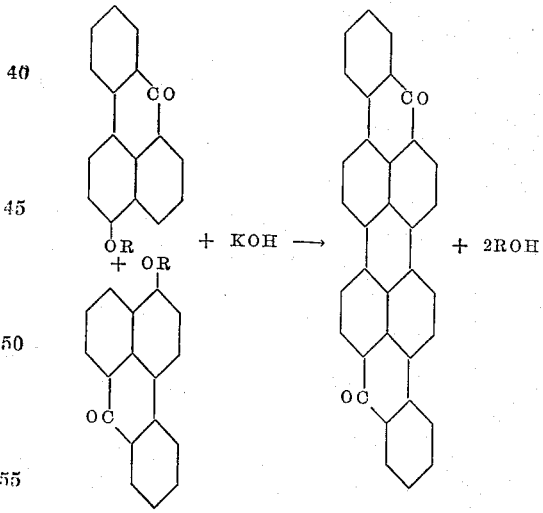

The following examples serve to illustrate our invention without being intended to limit it thereto; the parts are by weight.

1. One part of benzanthronyl-Bz-1-methyl-ether (melting point 172°, color of solution in concentrated sulfuric acid: reddish violet), 4, 5 parts of caustic potash and 4 parts by volume of alcohol are gradually heated to 210°. The formation of froth begins already at about 160° C. and only subsides when the temperature has risen to approximately 210°. At 220° the dyestuff is completely formed. From the cold melt the dyestuff is extracted with water in the form of a leuco compound. After having blown out the dyestuff with air, it is subjected to a further purifying process by dissolving it in concentrated sulfuric acid and reprecipitating. The dyestuff thus obtained dyes cotton from a blue vat a violet tint; the color of its solution in concentrated sulfuric acid is greenish-blue.

2. One part of benzanthronyl-Bz-1-phenyl ether (melting point 185°, solution in conc. sulfuric acid fuchsine-red) is well mixed with 5 parts of caustic potash and 5 parts by volume of alcohol and this mixture is heated within one hour to 220–230° C. At 170° C. the mass becomes thin-liquid and begins to form froth. The melted mass is then kept at a temperature of 230–240° for another 1–2 hours until the bubbling has ceased. After cooling, the mass is lixiviated with water and the coloring matter is precipitated by blowing air through it. Purified by means of concentrated sulfuric acid, it dyes from a blue vat cotton in clear reddish-violet tints. The color of its solution in concentrated sulfuric acid is pure green. It gives a quantitative yield.

3. One part of diphenoxy benzanthrone (obtained by treating dibrom benzanthrone—produced according to Example 4 of the patent of addition No. 6,719 to French Patent No. 349,531—with phenol, dissolving in concentrated sulfuric acid with a bluish-green color, which becomes reddish-violet on standing) is well stirred with 5 parts of caustic potash and 5 parts by volume of alcohol and then slowly heated to 230–240° C. The resulting product is worked up according to Example 1. The dyestuff, which is obtained with a good yield, dyes cotton from a blue vat bluish-violet tints. Its solution in concentrated sulfuric acid is of an olive-green color.

4. If the 6-amino benzanthronyl-Bz-1-phenyl ether (obtained by treating 6-amino-Bz-1-bromobenzanthrone with phenol) is melted with an alkali according to the process set forth in Example 1, there is obtained a vat dyestuff with a good yield giving on cotton a bluish grey dyeing.

5. 100 parts of Bz-1-bromo benzanthrone, prepared by brominating benzanthrone in water, 34 parts of crystallized phenol, 34 parts of dehydrated potassium acetate and one part of cuprous bromide are boiled while stirring for 10–12 hours at about 170° C. The molten mass, which contains the formed benzanthronyl-Bz-1-phenyl ether acetic acid, phenol, and potassium bromide, is then cooled to 80° C. and then mixed and stirred with 400 parts of denaturated alcohol for a short time whereupon 250–300 parts of pulverized caustic potash are added at about 50° C. Thereafter the mass is slowly heated, while stirring, to 220° C. whereby the alcohol is distilled off (approximately 350 parts of it). The mass is then heated for a short time until a sample taken from it gives in concentrated sulfuric acid a pure green solution. After cooling, the molten mass is lixiviated with a considerable quantity of water, blown out with air, filtered by suction and washed until it is neutral. The resulting dyestuff, after being dried, is dissolved in 10 times the quantity of concentrated sulfuric acid and precipitated as usual. The dyestuff gives an almost quantitative yield. It is identical with that obtained according to Example 2.

We claim:

1. A process of making vat dyestuffs of the iso dibenzanthrone series, which comprises subjecting a benzanthrone compound unsubstituted in the 2-position and containing an ether group in the Bz-1-position to the action of an alkaline condensing agent.

2. A process of making vat dyestuffs of the iso dibenzanthrone series, which comprises subjecting a benzanthrone compound unsubstituted in the 2-position and containing an aryl ether group in the Bz-1-position to the action of an alkaline condensing agent.

3. A process of making vat dyestuffs of the iso dibenzanthrone series, which comprises subjecting a benzanthrone compound unsubstituted in the 2-position and containing a phenyl ether group in the Bz-1-position to the action of an alkaline condensing agent.

4. A process of making vat dyestuffs of the iso dibenzanthrone series, which comprises subjecting a benzanthrone compound unsubstituted in the 2-position and containing an ether group in the Bz-1-position to the action of potassium hydroxide and an alcohol.

5. A process of making vat dyestuffs of the iso dibenzanthrone series, which comprises subjecting a benzanthrone compound unsubstituted in the 2-position and containing an aryl ether group in the Bz-1-position to the action of potassium hydroxide and an alcohol.

6. A process of making vat dyestuffs of the iso dibenzanthrone series, which comprises subjecting a benzanthrone compound unsubstituted in the 2-position and containing a phenyl ether group in the Bz-1-position to the action of potassium hydroxide and an alcohol.

In testimony whereof, we affix our signatures.

KARL THIESS.
WALTER GMELIN.
KARL ZAHN.